Patented May 21, 1929.

1,714,165

UNITED STATES PATENT OFFICE.

HARVEY N. GILBERT, OF LA SALLE, NEW YORK, ASSIGNOR TO THE ROESSLER & HASS-
LACHER CHEMICAL COMPANY, OF NEW YORK, N. Y., A CORPORATION OF NEW
YORK.

CARBONACEOUS MATERIAL AND PROCESS FOR MAKING SAME.

No Drawing. Application filed May 9, 1925. Serial No. 29,235.

This invention relates to producing formed articles composed of particles of graphite or other powdered material cemented together by a carbon binder. The object of the invention is to produce formed articles of low porosity and superior mechanical and electrical qualities suitable for electrodes, brushes, contact materials, tiles and other uses to which articles fabricated with a carbon binder are commonly put.

The common method of fabricating articles with a carbon binder is to prepare the mixture of solid particles, usually coke, and a carbonaceous binder such as pitch. This mixture is pressed into the desired shape by means of hydraulic press and a suitable mould, or by extruding the mixture from a die. The formed article is then packed in a furnace in carbon or coke dust to protect it from the air and baked to carbonize the binder. This baking is done by very slowly advancing the temperature until the pitch or tar binder has entirely carbonized.

Heating may be carried to any extent beyond this setting point of the binder, and within certain limits the properties of the resulting product may be varied by the temperature to which it is fired, as the binder becomes harder and stronger when heated to higher temperatures.

For many purposes carbon in the form of graphite is preferable to ungraphitized carbon because the former has a higher electrical conductivity and is chemically less reactive than the latter. Electrodes of graphitized carbon cost more to make than similar electrodes made from ungraphitized carbon. The reason for this difference in cost arises not only from the fact that graphitized articles must be heated to a much higher temperature than ungraphitized articles, but also because graphitized articles are made in two steps, in the second of which there is a heavy loss from failures due to cracks, warping and other deformations.

It is apparent that if carbon could be graphitized in bulk and then fabricated into electrodes with a tar or pitch binder, it should be possible to make a product considerably superior to ungraphitized carbon without subjecting the fabricated product to high temperature necessary for graphitization. For example, if finely divided graphite can be formed into an article so as to contain 80% of graphite and 20% of binder, the article will contain over 80% graphite after being baked at a temperature sufficiently high to carbonize the binder. Such an article will have an electrical conductivity approximating that of pure graphite, and it should have better mechanical qualities than graphite electrodes as now made.

I found that when fabricating articles in a similar manner with amorphous carbon, the articles did not swell as much during the heating operation and had good mechanical and electrical qualities after the baking was completed. In an article made of amorphous carbon such as powdered coke or coal, the solid particles tend to interlock to some extent so that after once being pressed into shape the interlocking of the particles tends to maintain the integrity of the piece without much assistance from the binder. Such interlocking tends to better resist the expansive force of gases evolved from the binder during the process of baking but such product is not as dense and strong as it could be. During the baking operation the viscosity of the binder progressively decreases and is halted only by the initial decomposition of the binder. There is, therefore, always a chance that during baking the piece will acquire a disruptive pressure from the decomposition of the binder. Articles thus tend to swell during baking and it is not surprising that there is so much loss from failures due to cracks and other deformations during that critical period.

These observations led to the discovery of a general method of producing articles composed of particles held together by a carbon binder, which articles will have a higher apparent specific gravity than is possible to produce by present known methods. I discovered that mechanical restraining force can be successfully used to oppose the expansive forces in all directions during baking, at least, until after the binder is sufficiently carbonized as to lose its plastic nature.

This method is quite general in its application and can be used in making tile for roofing and other purposes and many other solid forms in which carbon or other binder is used. When carbon or graphite is used as the solid held together by the binder, the product has important electrical properties which render it available for such uses as brushes for electrical machines, electrodes, contacts, and other articles in which high mechanical strength and the other valuable qualities attending high apparent specific gravity are desirable.

I will give an illustration of the application of this method in making electrodes from powdered graphite and pitch. A mixture of 20% hard pitch and 80% powdered graphite is pressed at a temperature of 250° C. in a steel mould. The plunger is then clamped in position pressing on the material in the mould, and the mould and contents are heated to a temperature where the pitch is decomposed. Such temperature is just below a dull red heat. Gases resulting from the decomposition of the pitch binder escape from the space between the plunger and the mould. When no more gas escapes the heating is discontinued and the article removed from the mould. The product thus obtained is mechanically strong and rigid but for electrical purposes it may be heated to a higher temperature in a separate furnace of any type. This subsequent heating does not produce expansion; in fact it may be carried to 1000° C. or higher and the articles so heated will contract and be more dense at the end of baking than at the beginning.

I have also applied this principle by constantly applying a mechanical pressure on the material during the decomposition of the binder. I have also placed the unbaked articles pressed from the proper pitch mixture, in a container or mould which would permit gases and vapors to escape but which would not permit expansive movement of the solid piece to occur, and have conducted the decomposition of the pitch under these conditions.

While I have mentioned several methods of opposing the expansive forces during the decomposition of the binder, there are many other ways of applying this same principle, as I do not wish to be limited to any one method of operation.

Electrodes made by this method from pure graphite and pitch will have apparent specific gravity from upwards of 1.7 to as high as 1.8 to 1.9 after heating at 1000° C. This is considerably higher than the apparent specific gravity of either carbon or graphite electrodes now on the market.

The mechanical properties of these electrodes are as good as or better than the best grade of carbon, which means that it is considerably better in a mechanical way than the best grades of graphite electrodes now on the market. The electrical conductivity is better than that of the best grade of ungraphitized carbon. If it is desired to make a pure graphite electrode such articles may be placed in a graphitizing furnace. After graphitization they show superior qualities when compared with forms of graphite that are now obtainable. It is evident that for many purposes such as low temperature electrolytic work there is no particular reason for having an electrode made of 100% graphite. For many such purposes it is more important to have a surface that is durable when subject to erosion than to have one that has a particularly high conductivity and so soft that it cannot stand up well against the washing of liquids. There is no significant wastage when carbon is graphitized in bulk. According to my method of fabricating electrodes from carbon that has already been graphitized the losses from the process are small indeed. My process is therefore economically adaptable either to electrodes made partly of ungraphitized carbon or to electrodes that must be 100% graphite.

I do not wish to be limited to any particular binder, although I find that hard grades of pitch having a minimum of volatile matter and a maximum of hydrocarbons of high melting point and of high viscosity are conveniently and inexpensively obtained and give good results.

I claim:

1. The process of manufacturing a shaped article of an apparent specific gravity over 1.7 consisting in filling a mould with a mixture of comminuted graphitized carbon and a carbonaceous plastic binder, compressing said mixture, and carbonizing the binder while resisting by mechanical means expansion of the formed body, and then continuing the heating to effect further increase in density.

2. A new product having an apparent specific gravity of upwards of 1.7 and consisting of graphite to the extent of upwards of 80% thoroughly disseminated throughout the mass, the balance of the article being composed of ungraphitized carbon holding the graphitized particles together.

3. The process of manufacturing a shaped article of an apparent specific gravity of over 1.7, consisting in forming a mixture of comminuted graphitized carbon and a hard pitch, forming to shape under pressure and heat sufficient to soften the pitch without carbonizing it, and carbonizing the pitch while resisting by mechanical means expansion of the formed body until the pitch is sufficiently carbonized to lose its plastic nature.

4. The process of manufacturing a shaped article of an apparent specific gravity over 1.7 consisting in forming a plastic body from comminuted carbon and a carbonaceous binder under pressure, and preventing expansion of the formed body by mechanical means while carbonizing the binder, and further heating the formed body to a higher temperature to effect further increase in density.

5. The process of manufacturing a shaped article of an apparent specific gravity over 1.7 consisting in forming a plastic body from comminuted carbon and a carbonaceous binder under pressure, and preventing expansion of the formed body while carbonizing the binder, and thereafter graphitizing the formed body.

6. The process of manufacturing a shaped article of an apparent specific gravity over 1.7 consisting in forming a plastic body from comminuted carbon and a carbonaceous binder under pressure in a mould, and heating the body in a mould to carbonize the binder while preventing expansion of the formed body by mechanical means.

7. The process of manufacturing a shaped article of an apparent specific gravity over 1.7 consisting essentially of graphite which comprises forming a mixture of comminuted graphite and carbonaceous binder, moulding the mixture under pressure, and carbonizing the binder while resisting expansion of the formed body by applying a mechanical pressure on the material in a mould during the carbonizing of the binder.

Signed at Niagara Falls, in the county of Niagara and State of New York this 7th day of May, A. D. 1925.

HARVEY N. GILBERT.